(12) United States Patent
Okura (10) Patent No.: US 11,945,413 B2
(45) Date of Patent: Apr. 2, 2024

(54) RAINFALL AMOUNT MEASUREMENT APPARATUS

(71) Applicant: DENSO CORPORATION, Kariya (JP)

(72) Inventor: Takamitsu Okura, Kariya (JP)

(73) Assignee: DENSO CORPORATION, Kariya (JP)

( * ) Notice: Subject to any disclaimer, the term of this patent is extended or adjusted under 35 U.S.C. 154(b) by 645 days.

(21) Appl. No.: 17/135,282

(22) Filed: Dec. 28, 2020

(65) Prior Publication Data

US 2021/0114559 A1 Apr. 22, 2021

Related U.S. Application Data

(63) Continuation of application No. PCT/JP2019/021841, filed on May 31, 2019.

(30) Foreign Application Priority Data

Jul. 11, 2018 (JP) ................... 2018-131630

(51) Int. Cl.
*B60S 1/08* (2006.01)
*G01N 21/55* (2014.01)

(52) U.S. Cl.
CPC ............ *B60S 1/0833* (2013.01); *G01N 21/55* (2013.01); *B60S 1/0807* (2013.01); *G01N 2201/0638* (2013.01)

(58) Field of Classification Search
CPC .... B60S 1/0833; B60S 1/0807; B60S 1/0818; B60S 1/0837; G01N 21/55; G01N 2201/0638; G01N 21/552; G01N 2021/9586; G01W 1/14

USPC .......................................................... 701/1, 36
See application file for complete search history.

(56) References Cited

U.S. PATENT DOCUMENTS

| 4,286,200 A | * | 8/1981 | Brown ................... B60S 1/0807 |
| | | | 318/443 |
| 4,476,419 A | * | 10/1984 | Fukatsu ................ B60S 1/0837 |
| | | | 318/DIG. 2 |
| 4,554,493 A | * | 11/1985 | Armstrong ............. B60S 1/0822 |
| | | | 318/483 |
| 4,634,855 A | * | 1/1987 | Friend ..................... G06M 7/00 |
| | | | 250/223 R |
| 4,916,374 A | * | 4/1990 | Schierbeek ........... B60S 1/0818 |
| | | | 318/483 |

(Continued)

FOREIGN PATENT DOCUMENTS

| EP | 2 690 597 A2 | 1/2014 |
| EP | 3339113 A1 * | 6/2018 ............... B60Q 9/00 |

(Continued)

*Primary Examiner* — Jaime Figueroa
(74) *Attorney, Agent, or Firm* — POSZ LAW GROUP, PLC (57) ABSTRACT

In a rainfall amount measurement apparatus, raindrop amount information corresponding to an attachment amount of raindrops attached to an outer wall surface of a windshield of the vehicle in a measurement period is acquired based on an output of a detector configured to generate an output corresponding to the attachment amount of raindrops. The raindrop amount information is used to set a wiping interval in a wiper wiping the raindrops attached to the outer wall surface. The measurement value of a rainfall amount per unit time is calculated based on the raindrop amount information, and outputted to an outside of the vehicle.

12 Claims, 3 Drawing Sheets

(56) References Cited

U.S. PATENT DOCUMENTS

| | | | | |
|---|---|---|---|---|
| 4,987,296 A * | 1/1991 | Kajioka | | B60S 1/0822 340/602 |
| 5,059,877 A * | 10/1991 | Teder | | B60S 1/0818 318/483 |
| 5,105,129 A * | 4/1992 | Shimizu | | B60S 1/0859 318/443 |
| 5,117,168 A * | 5/1992 | Nomura | | B60S 1/0818 318/DIG. 2 |
| 5,119,002 A * | 6/1992 | Kato | | B60S 1/0859 318/483 |
| 5,140,234 A * | 8/1992 | Wallrafen | | B60S 1/0818 318/264 |
| 5,216,341 A * | 6/1993 | Nomura | | B60S 1/0818 318/DIG. 2 |
| 5,313,072 A * | 5/1994 | Vachss | | B60S 1/0844 340/602 |
| 5,428,277 A * | 6/1995 | Stanton | | G01N 21/43 318/483 |
| 5,453,670 A * | 9/1995 | Schaefer | | B60S 1/0818 318/DIG. 2 |
| 5,453,676 A * | 9/1995 | Agrotis | | G06V 20/56 318/443 |
| 5,568,027 A * | 10/1996 | Teder | | B60S 1/0818 318/483 |
| 5,847,826 A * | 12/1998 | Fukui | | B60S 1/0818 340/602 |
| 6,057,660 A * | 5/2000 | Meier | | B60S 1/38 318/483 |
| 6,087,795 A * | 7/2000 | Amagasa | | B60S 1/0818 318/446 |
| 6,160,369 A * | 12/2000 | Chen | | G06V 20/56 318/483 |
| 6,313,457 B1 * | 11/2001 | Bauer | | B60R 1/088 318/483 |
| 6,331,819 B1 * | 12/2001 | Hog | | B60S 1/0818 340/602 |
| 6,353,392 B1 * | 3/2002 | Schofield | | B60S 1/0888 340/602 |
| 6,379,013 B1 * | 4/2002 | Bechtel | | B60Q 1/1423 359/604 |
| 6,590,650 B1 * | 7/2003 | Delahaye | | G01N 15/0205 356/335 |
| 6,765,631 B2 * | 7/2004 | Ishikawa | | B60S 1/0818 318/483 |
| 6,892,580 B2 * | 5/2005 | Pankey | | G01W 1/14 318/443 |
| 6,936,985 B2 * | 8/2005 | Pankey | | B60S 1/0818 318/443 |
| 7,095,199 B2 * | 8/2006 | Hirose | | B60S 1/0818 318/443 |
| 7,235,944 B2 * | 6/2007 | Morishita | | B60S 1/0896 318/483 |
| 7,733,049 B2 * | 6/2010 | Hiramoto | | B60S 1/0818 73/170.21 |
| 8,076,887 B2 * | 12/2011 | Ohata | | B60S 1/0818 318/484 |
| 11,168,854 B2 * | 11/2021 | Broers | | G01W 1/14 |
| 2001/0028234 A1 * | 10/2001 | Banhidy | | B60S 1/0818 318/483 |
| 2002/0020804 A1 * | 2/2002 | Bauer | | G01J 1/46 318/483 |
| 2005/0016275 A1 * | 1/2005 | Pankey | | B60S 1/0818 73/579 |
| 2005/0017666 A1 * | 1/2005 | Pankey | | B60S 1/0818 318/443 |
| 2007/0132417 A1 * | 6/2007 | Kokuryo | | B60S 1/0818 318/483 |
| 2008/0030159 A1 * | 2/2008 | Hiramoto | | B60S 1/0818 73/170.21 |
| 2008/0211679 A1 * | 9/2008 | Kokuryo | | B60S 1/0818 318/483 |
| 2009/0089955 A1 * | 4/2009 | Ohata | | B60S 1/08 15/250.12 |

FOREIGN PATENT DOCUMENTS

| | | | |
|---|---|---|---|
| JP | 3925442 B2 | | 6/2007 |
| JP | 2016148582 A | * | 8/2016 |
| JP | 2016148582 A | | 8/2016 |
| JP | 2016217777 A | | 12/2016 |

* cited by examiner

RAINFALL AMOUNT MEASUREMENT APPARATUS

CROSS REFERENCE TO RELATED APPLICATIONS

The present application is a continuation application of International Patent Application No. PCT/JP2019/021841 filed on May 31, 2019, which designated the U.S. and claims the benefit of priority from Japanese Patent Application No. 2018-131630 filed on Jul. 11, 2018. The entire disclosures of all of the above applications are incorporated herein by reference.

TECHNICAL FIELD

The present disclosure relates to a rainfall amount measurement apparatus mounted on a vehicle.

BACKGROUND

The wiper is basic equipment mounted on a vehicle such as an automobile. The wiper is provided to wipe off raindrops attached to the outer wall surface of the windshield of the vehicle. The drive of the wiper is controlled so that the wiper operates with wiping intervals at a wiping speed according to the amount of rainfall. In recent years, a configuration with a raindrop sensor has become widespread. In such a configuration, the raindrop sensor is provided for detecting raindrops on the inner wall surface of the windshield and the drive of a wiper is controlled by a detection signal of the raindrop sensor. In a vehicle equipped with a raindrop sensor, the raindrop sensor outputs a detection signal corresponding to the amount of rainfall at the location at which the vehicle is present.

SUMMARY

According to an example of the present disclosure, a rainfall amount measurement apparatus is provided as follows. In the rainfall amount measurement apparatus, raindrop amount information corresponding to an attachment amount of raindrops attached to an outer wall surface of a windshield of the vehicle in a measurement period is acquired based on an output of a detector configured to generate an output corresponding to the attachment amount of raindrops. The raindrop amount information is used to set a wiping interval in a wiper wiping the raindrops attached to the outer wall surface. The measurement value of a rainfall amount per unit time is calculated based on the raindrop amount information, and outputted to an outside of the vehicle.

BRIEF DESCRIPTION OF DRAWINGS

The objects, features, and advantages of the present disclosure will become more apparent from the following detailed description made with reference to the accompanying drawings. In the drawings.

DETAILED DESCRIPTION

Hereinafter, an embodiment will be described with reference to the drawings. It should be noted that, regarding various modified examples applicable to one embodiment, if inserted in the middle of a series of description regarding the embodiment, understanding of the embodiment may be hindered. Therefore, the modified examples will be collectively described after the description of the embodiment.

(Schematic Configuration of Vehicle)

First, a schematic configuration of a vehicle 1 to which the present disclosure is applied will be described with reference to FIG. 1. The vehicle 1 is a so-called automobile and has a box-shaped vehicle body 1a. A windshield 2 is installed on the front side of the vehicle interior of the vehicle body 1a. The windshield 2 has an outer wall surface 2a and an inner wall surface 2b. The outer wall surface 2a is a surface of the windshield 2 that faces the outside air in front of the vehicle interior. The inner wall surface 2b is a surface opposite to the outer wall surface 2a and is a surface facing the vehicle interior.

The vehicle 1 includes a wiper 3, a drive motor 4, a wiper switch 5, a raindrop sensor 6, a wiper ECU 7, a body ECU 8, and an outside communication ECU 9. ECU is an abbreviation of Electronic Control Unit.

The wiper 3 is provided so as to wipe away the raindrops D attached to the outer wall surface 2a of the windshield 2. The drive motor 4 is provided to drive the wiper 3 based on a drive signal generated by the wiper ECU 7 in response to inputs from the wiper switch 5 and the raindrop sensor 6.

The wiper switch 5 is provided in the vehicle interior. The wiper switch 5 includes a mode switch 51 and a sensitivity switch 52. The mode switch 51 is provided for setting the operation mode of the wiper 3. The operation mode of the wiper 3 includes a stop mode, a manual mode, and an automatic mode. The manual mode is a mode in which the wiper 3 is continuously operated at a constant speed, and includes a low speed mode and a high speed mode. The automatic mode is a mode in which the operation mode of the wiper 3 is automatically set according to the output of the raindrop sensor 6, that is, the attachment amount of raindrops. The attachment amount of raindrops is an amount of raindrops D attached to the outer wall surface 2a of the windshield 2. The sensitivity switch 52 is a volume switch. That is, the sensitivity switch 52 is provided to adjust the change mode of the wiping interval of the wiper 3 according to the change of the attachment amount of raindrops when the automatic mode is selected by the mode switch 51.

The raindrop sensor 6 is arranged to face the inner wall surface 2b of the windshield 2 so as to detect the attachment amount of raindrops. The raindrop sensor 6 is configured to generate an output according to an attachment rate of the raindrop D in a detection region R set in a part of the outer wall surface 2a of the windshield 2.

Specifically, the raindrop sensor 6 is configured to output raindrop amount information to the wiper ECU 7 as a wiper driver. The raindrop amount information is information corresponding to the attachment amount of raindrops in the measurement period, and is used for the wiper ECU 7 to set the wiping interval in the wiper 3. The wiping interval is a time interval between two wiping operations that are temporally adjacent to each other, and is also referred to as an intermittent time. The "wiping operation" is a series of movements of the wiper 3 starting from a predetermined stop position, moving to the maximum wiping position, and then returning to the stop position. That is, the wiping interval is a period of time during which the wiper 3 is stopped at the stop position from the end of one wiping operation to the start of the next one wiping operation. The "maximum wiping position" is also referred to as the "upward reversal position". The "stop position" is also referred to as the "downward reversal position". The measurement period is a period of time during which the measurement of the attachment amount of raindrops by the raindrop sensor 6 is validated. Details of the configuration of the raindrop sensor 6 and details of the measurement period will be described later.

The wiper ECU 7 is an in-vehicle microcomputer and is electrically connected to the drive motor 4 so as to control the drive of the wiper 3. The wiper ECU 7 is electrically connected to the wiper switch 5 so as to set the operation mode of the wiper 3 according to the operation state of the wiper switch 5.

The raindrop sensor 6, the wiper ECU 7, the body ECU 8, and the outside communication ECU 9 are connected to each other via an in-vehicle network or communication link such as LIN so as to be able to communicate information with each other. LIN is an abbreviation for Local Interconnect Network.

The body ECU 8 is an in-vehicle microcomputer, and is provided to control the operations of the door lock mechanism, the power window mechanism, and the like, which are control targets. The body ECU 8 is also configured to be able to supply the vehicle speed detected by a vehicle speed sensor (not shown) to the wiper ECU 7 via the in-vehicle network.

The outside communication ECU 9 as a communication unit is an in-vehicle microcomputer and is provided so as to communicate with an outside X of the vehicle. Specifically, the outside communication ECU 9 is configured to be able to execute V2X communication. "V2X" is also called "vehicle-to-any" and is a concept including V2V and V2I. "V2V" refers to vehicle-to-vehicle communication and is an abbreviation for Vehicle to Vehicle. "V2I" refers to road-vehicle communication and is an abbreviation for Vehicle to Infrastructure. In the present embodiment, the vehicle outside X is a database that constitutes a weather information collecting system that automatically collects weather information. In the present embodiment, the outside communication ECU 9 is an automatic driving ECU. That is, the outside communication ECU 9 is configured to realize the advanced driving assistance technology including the automatic driving in the vehicle 1 based on (i) the output of the in-vehicle sensors such as the camera sensor and the radar sensor and (ii) the V2X communication result.

(Raindrop Sensor)

Figure 2:
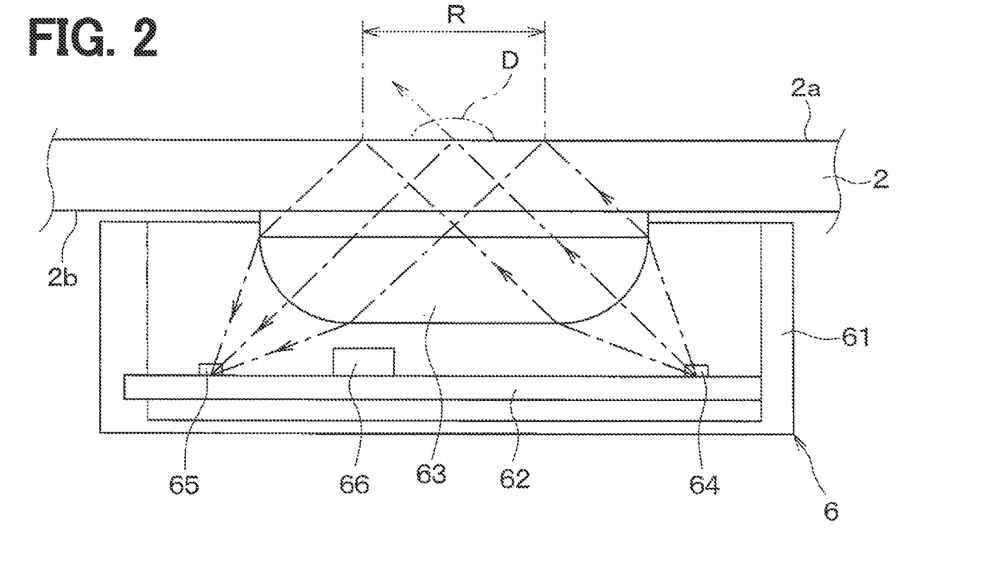
FIG. 2 is a sectional view showing a schematic configuration of the raindrop sensor shown in FIG. 1.

Referring to FIG. 2, the raindrop sensor 6 includes a sensor case 61, a circuit board 62, and an optical element 63. A light emitter 64, a detector 65, and a controller circuit 66 are mounted on the circuit board 62.

The sensor case 61, which constitutes the casing of the raindrop sensor 6, is arranged to face the inner wall surface 2b of the windshield 2. Specifically, the sensor case 61 is formed in a box shape that opens toward the inner wall surface 2b of the windshield 2. In the sensor case 61, the circuit board 62 and the optical element 63 are accommodated while being fixedly supported.

The light emitter 64 has a light emitting element, for example, a light emitting diode, which generates measurement light which is infrared light or visible light. The light emitter 64 is provided so as to emit the measurement light toward the outer wall surface 2a of the windshield 2.

The detector 65 has a light receiving element such as a photodiode. The detector 65 is provided so as to generate an output corresponding to the attachment amount of raindrops. Specifically, the detector 65 receives the reflection light of the measurement light by the outer wall surface 2a of the windshield 2. Thus, an output (for example, voltage) corresponding to the amount of received reflection light is generated.

The optical element 63 has a prism and a lens. The optical element 63 is configured to irradiate the entire measurement region R with the measurement light emitted from the light emitter 64. Further, the optical element 63 is configured to collect the reflection light from the detection region R onto the detector 65.

As described above, the light emitter 64 is provided on the side of the inner wall surface 2b so as to emit the measurement light toward the detection region R. Further, the detector 65 is provided on the side of the inner wall surface 2b so as to receive the reflection light of the measurement light from the detection region R.

The controller circuit 66 is an integrated circuit package and includes a CPU, a ROM, a RAM, a non-volatile RAM, an input/output interface, etc., which are not shown. The non-volatile RAM is, for example, a flash ROM. The CPU, ROM, RAM and non-volatile RAM of the controller circuit 66 will be simply referred to as "CPU", "ROM", "RAM" and "non-volatile RAM" hereinafter.

The controller circuit 66 is provided so as to control the operation of the raindrop sensor 6. Specifically, the controller circuit 66 is electrically connected to the light emitter 64 via a communication link so as to control the irradiation timing of the measurement light in the light emitter 64. Further, the controller circuit 66 is electrically connected to the detector 65 via a communication link so as to receive the output signal of the detector 65.

(Rainfall Amount Measurement Apparatus)

Figure 3:
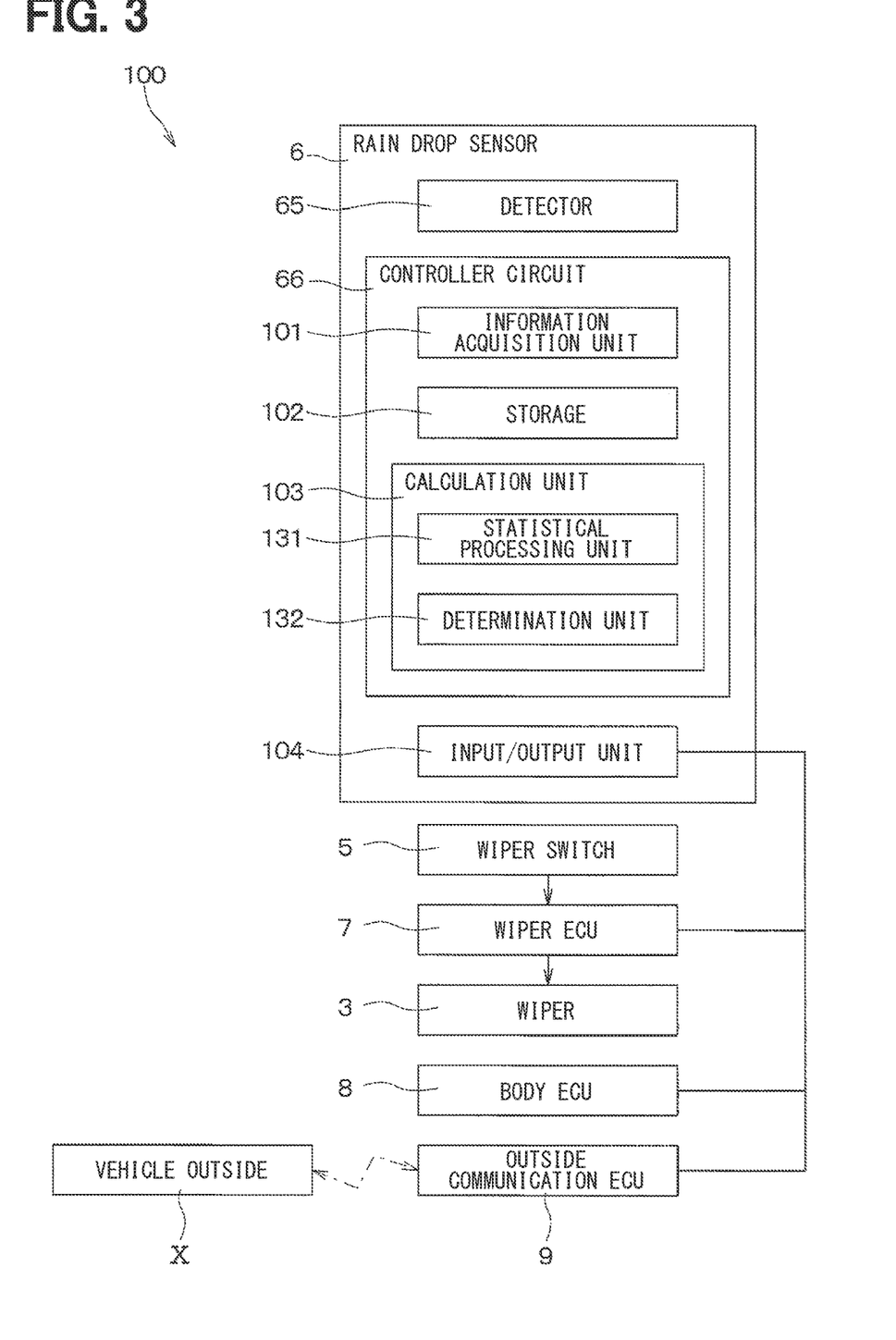
FIG. 3 is a block diagram showing a schematic functional configuration of a rainfall amount measurement apparatus according to the embodiment.

Referring to FIG. 3, the in-vehicle rainfall amount measurement apparatus 100 according to the present embodiment is built in the raindrop sensor 6. That is, the rainfall amount measurement apparatus 100 is provided as being or including the controller circuit 66 in the raindrop sensor 6 mounted on the vehicle 1.

Specifically, the rainfall amount measurement apparatus 100 includes an information acquisition unit 101, a storage 102, a calculation unit 103, and an input/output unit 104. That is, the detector 65, the information acquisition unit 101, the storage 102, the calculation unit 103, and the input/output unit 104 are provided in the raindrop sensor 6. Hereinafter, with reference to FIG. 3 and FIG. 4, a functional configuration of each unit or the like in the rainfall amount measurement apparatus 100 will be described.

The information acquisition unit 101 is provided so as to acquire the raindrop amount information corresponding to the attachment amount of raindrops during the measurement period based on the output of the detector 65. In the present embodiment, the information acquisition unit 101 is configured to acquire the integrated value of the output of the detector 65 within one measurement period as the raindrop amount information. That is, the raindrop amount information is an integrated value of the attachment rate information. The attachment rate information is information corresponding to the attachment rate of the raindrop D to the detection region R. Specifically, the attachment rate information is information corresponding to the degree of decrease in the amount of light received by the detector 65 during each of a plurality of sampling times set within the measurement period due to the attachment of raindrops D on the detection region R. The sampling time is, for example, 80 msec.

The storage 102 is provided so as to store raindrop amount information for a plurality of measurement periods. Specifically, the storage 102 is configured to store the raindrop amount information, in time series, from a predetermined time (for example, two hours ago) to a time when the latest raindrop amount information is acquired.

The calculation unit 103 is provided to calculate the measurement value of the rainfall amount per unit time based on the raindrop amount information acquired and stored in the storage 102 by the information acquisition unit 101. The unit of "the rainfall amount per unit time" is mm/min or mm/h. The measurement value of the rainfall amount per unit time is hereinafter referred to as "rainfall amount measurement value P". The input/output unit 104 is provided so as to output the rainfall amount measurement value P calculated by the calculation unit 103 to an outside communication ECU 9.

Figure 4:
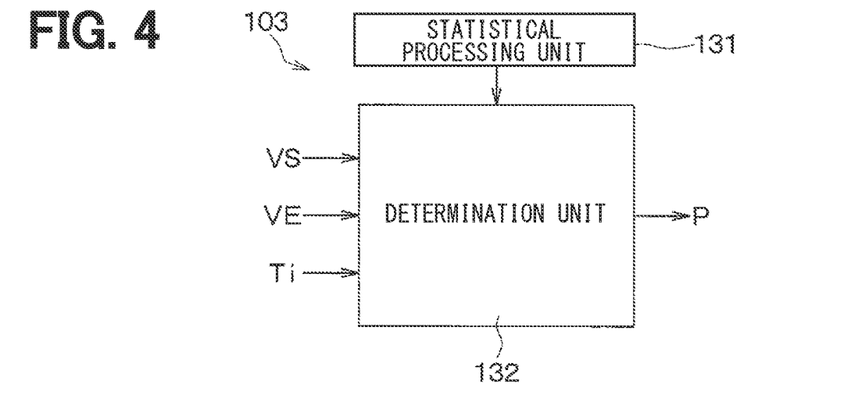
FIG. 4 is a block diagram showing a schematic functional configuration of a determination unit shown in FIG. 3.

In the present embodiment, the calculation unit 103 includes a statistical processing unit 131 and a determination unit 132. The statistical processing unit 131 is provided to statistically process the raindrop amount information for a plurality of measurement periods stored in the storage 102. The statistical processing includes, for example, moving average processing.

The determination unit 132 is provided to determine the rainfall amount measurement value P based on the result of the statistical processing by the statistical processing unit 131. Specifically, the determination unit 132 is configured to determine the rainfall amount measurement value P based on the wiping interval Ti, the vehicle speed VE, and the output mode of the sensor output VS during the measurement period. The sensor output VS is an output voltage of the detector 65.

(Operation Overview)

The overview of the operation of the configuration of the present embodiment will be described below along with the effects provided by the configuration.

Figure 1:
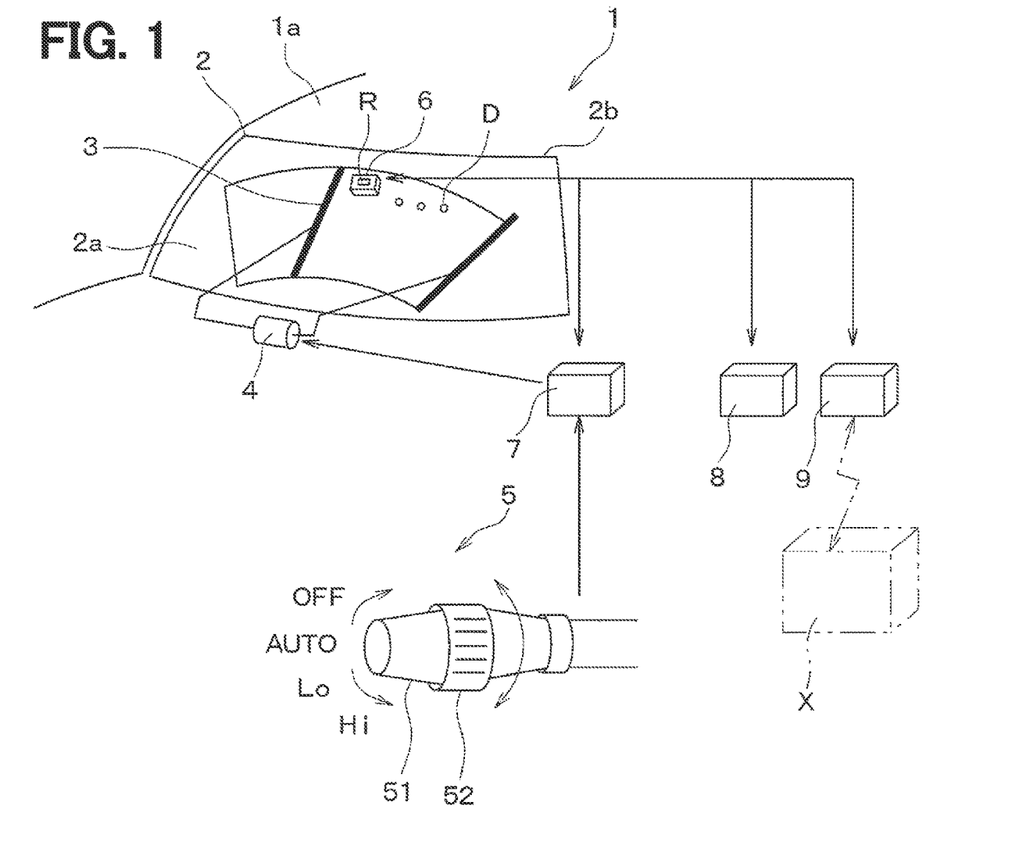
FIG. 1 is a schematic configuration diagram of a vehicle according to an embodiment.

With reference to FIGS. 1 to 3, an occupant of the vehicle 1 operates the wiper switch 5 to set an operation mode of the wiper 3. The operation mode of the wiper 3 is set to the automatic mode according to the operation state of the mode switch 51 of the wiper switch 5. Then, the wiper ECU 7 drives the wiper 3 according to the output of the raindrop sensor 6.

When the operation mode is set to the automatic mode, the operation of the raindrop sensor 6 starts. Then, the light emitter 64 starts radiation of the measurement light toward the detection region R at a predetermined timing. The light emitter 64 continues to emit the irradiation light during the measurement period.

The measurement period starts after a lapse of a predetermined time (for example, 10 msec) from a predetermined reference time point and ends when a predetermined condition is satisfied. The reference time point is a time point at which the wiper 3 completes the one-wiping operation during the intermittent operation, that is, the time point when one reciprocating operation of the wiper 3 is completed and the wiper 3 returns to the stop position. In this case, the measurement period is a period set within the wiping interval. On the other hand, the reference time point is a time point when the wiper 3 wipes the detection area R during the continuous operation, that is, a time point when the wiper 3 has passed the detection area R twice by one reciprocating operation. In the intermittent operation, the wiping interval Ti>0. In the continuous operation, the wiping interval Ti=0.

When the raindrop D is not attached to the detection region R, the measurement light emitted by the light emitter 64 travels as shown by the one-dotted line arrow in FIG. 2. That is, in this case, most of the measurement light is reflected by the outer wall surface 2a of the windshield 2 and received by the detector 65.

On the other hand, when the raindrop D is attached to the detection area R, a part of the measurement light travels as shown by the two-dotted line arrow in FIG. 2 due to the action of the raindrop D attached to the detection area R. That is, in this case, a part of the measurement light passes through the windshield 2 and the raindrop D, and thus is emitted to the outside of the windshield 2. As a result, the amount of light received by the detector 65 decreases. As the amount of raindrops D attached to the detection region R increases, the amount of light emitted to the outside of the windshield 2 increases, and the amount of light received by the detector 65 decreases.

Figure 5:
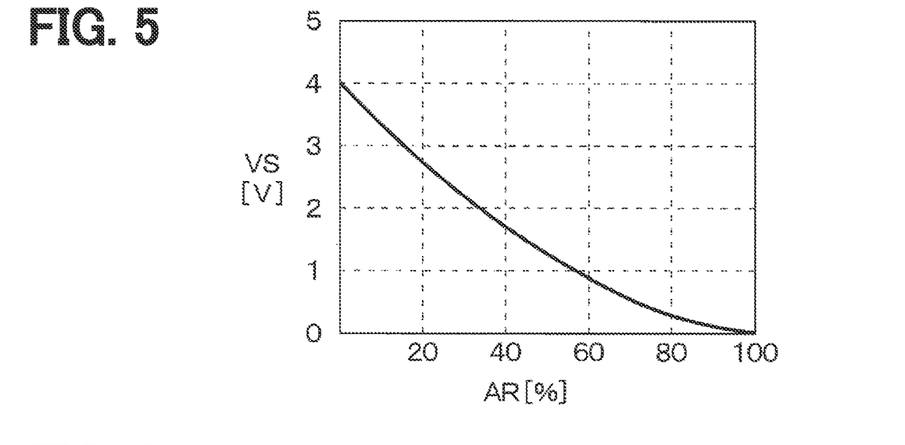
FIG. 5 is a graph showing an output characteristic of a detector shown in FIG. 3.

FIG. 5 shows the relationship between the sensor output VS and the raindrop attachment rate AR. The raindrop attachment rate AR is a value obtained by dividing the raindrop attachment area by the detection area and expressed as a percentage. The raindrop attachment area is an attachment area of the raindrop D in the detection region R. The detection area is an area of the detection region R. As shown in FIG. 5, the sensor output VS decreases as the raindrop attachment rate AR increases. In this way, the detector 65 generates an output corresponding to the amount of raindrops D attached to the outer wall surface 2a of the windshield 2.

Figure 6:
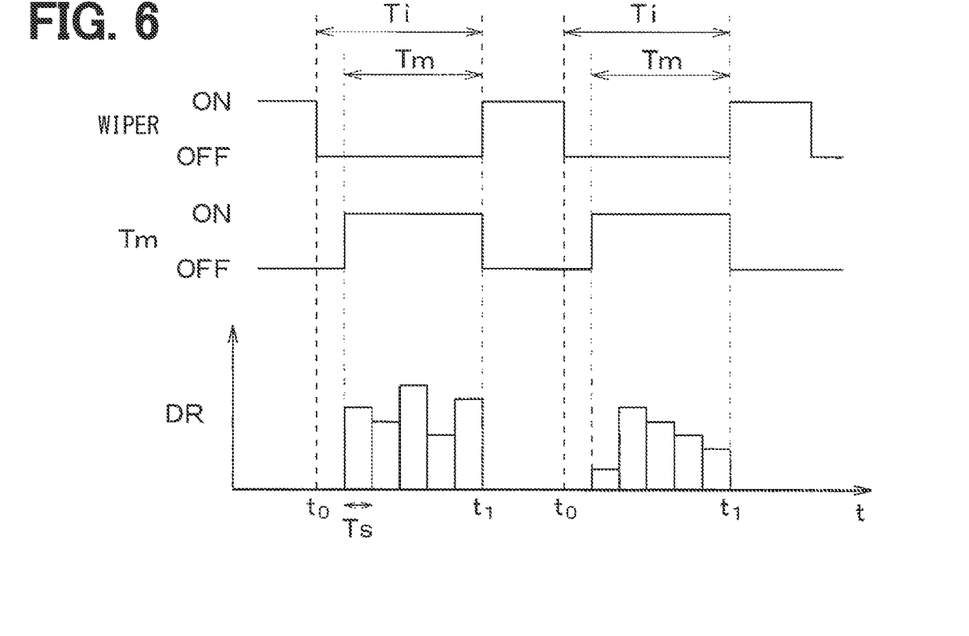
FIG. 6 is a time chart showing an outline of wiper control by the functional configuration shown in FIG. 3.

The information acquisition unit 101 acquires the raindrop amount information corresponding to the attachment amount of raindrops in the measurement period based on the output of the detector 65. FIG. 6 shows an operation of the wiper 3 and an acquisition of raindrop amount information during the intermittent operation. Referring to FIG. 6, the information acquisition unit 101 integrates decrease rates DR individually acquired at the sampling times Ts within the measurement period Tm. The decrease rate DR indicates the degree of decrease in the sensor output VS with respect to the sensor output VS when the raindrop attachment rate AR is 0. Specifically, the decrease rate DR is VS/VS0. VS0 is the sensor output VS when the raindrop attachment rate AR is 0. A plurality of sampling times Ts are set in the measurement period Tm. As described above, the measurement period Tm is set within the wiping interval Ti in the intermittent operation. Specifically, the measurement period Tm starts after a lapse of a predetermined time (for example, 10 msec) from the reference time point t0 that is the start of the wiping interval Ti. An ending time point t1 that is the end of the measurement period Tm is a time point when the wiping interval Ti set immediately before the current measurement period Tm has elapsed from the reference time point t0 as a starting point. Note that the integrated value may exceed a predetermined upper limit value before the wiping interval Ti has elapsed, as the amount of rainfall increases. In this case, the measurement period Tm ends when the integrated value exceeds the predetermined upper limit, and the intermittent operation is switched to the continuous operation.

As described above, the information acquisition unit 101 acquires the raindrop amount information corresponding to the current measurement period Tm by integrating the decrease rates DR within the current measurement period Tm. The raindrop amount information acquired by the information acquisition unit 101 is used to set the wiping interval Ti of the wiper 3 that wipes the raindrops D attached to the outer wall surface 2a of the windshield 2. That is, the input/output unit 104 outputs the raindrop amount information acquired by the information acquisition unit 101 to the wiper ECU 7. The wiper ECU 7 sets the wiping interval Ti and the measurement period Tm based on the received raindrop amount information. The wiper ECU 7 returns the set wiping interval Ti and the set measurement period Tm to the input/output unit 104 of the raindrop sensor 6.

In a known wiper control, the acquired raindrop amount information is erased for each setting of the wiping interval Ti. In addition, in a known in-vehicle rainfall amount measurement apparatus, the rainfall amount is measured using information of a system different from the setting of the wiping interval Ti. On the other hand, the rainfall amount measurement apparatus 100 of the present embodiment calculates the rainfall amount measurement value P based on the raindrop amount information acquired for setting the wiping interval Ti. The input/output unit 104 outputs the rainfall amount measurement value P calculated by the calculation unit 103 to the outside communication ECU 9. As a result, the rainfall amount measurement value P acquired by the vehicle 1 is transmitted to the outside X of the vehicle.

Specifically, in the present embodiment, the storage 102 stores the raindrop amount information acquired by the information acquisition unit 101 for a predetermined time. The statistical processing unit 131 statistically processes the raindrop amount information for a plurality of measurement periods stored in the storage 102. The determination unit 132 determines the rainfall amount measurement value P based on the result of the statistical processing by the statistical processing unit 131.

As described above, according to the configuration of the present embodiment, the raindrop amount information used for setting the wiping interval Ti in the wiper 3 can be used for calculating the measurement value of the rainfall amount per unit time. The rainfall amount measurement value P, which is the measurement value of the rainfall amount per unit time, can be used as official meteorological information. Therefore, according to the present embodiment, it is possible to provide a versatile rainfall amount measurement value with a simpler apparatus configuration.

When calculating the rainfall amount measurement value P, the operation mode of the wiper 3, the traveling speed of the vehicle 1, the size of the raindrop D, and the like are error factors. Therefore, in the present embodiment, the determination unit 132 determines the rainfall amount measurement value P based on the wiping interval Ti, the vehicle speed VE, and the output mode of the sensor output VS during the measurement period. Specifically, the output mode of the sensor output VS is, for example, a waveform of the raindrop attachment rate AR shown in FIG. 6. That is, the output form of the sensor output VS is the shape of the histogram of the raindrop attachment rate AR at each sampling time Ts. More specifically, the output form of the sensor output VS is the occurrence frequency and/or degree of change of the raindrop attachment rate AR in the histogram of the raindrop attachment rate AR.

Specifically, the determination unit 132 tentatively determines the rainfall amount measurement value P based on the raindrop amount representative value that is the result of the statistical processing by the statistical processing unit 131 and the map stored in the ROM or the non-volatile RAM. This map can be prepared, for example, by an experiment using equipment that can artificially realize a predetermined rainfall amount.

Further, the determination unit 132 determines the final rainfall amount measurement value P by multiplying the temporarily determined rainfall amount measurement value P by CC1 (VE), CC2 (Ti), and CC3 ($\Delta$VS). CC1(VE) is a correction coefficient having the vehicle speed VE as a parameter. CC2(Ti) is a correction coefficient with the wiping interval Ti as a parameter. CC3($\Delta$VS) is a correction coefficient using the standard deviation $\Delta$VS of the sensor output VS within the measurement period Tm as a parameter. These correction coefficients are calculated in advance by a fitting experiment and are stored in the ROM or the non-volatile RAM.

As described above, in the present embodiment, the calculation unit 103 determines the rainfall amount measurement value P in consideration of the wiping interval Ti, the vehicle speed VE, and the output form of the sensor output VS during the measurement period. Therefore, according to the present embodiment, a versatile measurement value of rainfall amount can be calculated with good accuracy.

MODIFIED EXAMPLES

The present disclosure is not necessarily limited to the above embodiment. Thus, it is possible to appropriately change the above-described embodiment. Representative modified examples will be described below. In the following description of modified examples, only parts different from the above-described embodiment will be described. In addition, in the above-described embodiment and the modified examples, the same reference signs are given to the same or equivalent parts. Therefore, in the description of the following modified examples, regarding constituent elements having the same reference signs as the constituent elements of the above-described embodiment, the description in the above-described embodiment can be appropriately cited unless there is a technical inconsistency or a specific additional explanation.

The present disclosure is not limited to the specific apparatus configuration shown in the above embodiment. For example, the wiper ECU 7 or the body ECU 8 may have a function as a communication unit that communicates with the outside X of the vehicle. That is, the outside communication ECU 9 as the communication unit may be the wiper ECU 7 or the body ECU 8.

In the above embodiment, the rainfall amount measurement apparatus 100 is provided as a functional configuration in the controller circuit 66 provided in the raindrop sensor 6. However, the present disclosure is not limited to such examples. That is, the rainfall amount measurement apparatus 100 may be provided as a functional configuration of the wiper ECU 7. In other words, the information acquisition unit 101, the storage 102, the calculation unit 103, and the input/output unit 104 may be the functional configuration provided in the in-vehicle microcomputer that configures the wiper ECU 7.

In the above-described embodiment, the parameters used by the determination unit 132 to determine the rainfall amount measurement value P are the wiping interval Ti, the vehicle speed VE, and the output form of the sensor output VS during the measurement period. However, the present disclosure is not limited to such examples. That is, at least one of the above parameters may be omitted. In other words, the determination unit 132 may determine the rainfall amount measurement value P based on at least one parameter of the parameters of the wiping interval Ti, the vehicle speed VE, and the output form of the sensor output VS during the measurement period.

The present disclosure is not limited to the specific operation examples shown in the above embodiment. For example, the wiping cycle may be used instead of the wiping interval. The wiping cycle is a cycle in which the wiper 3 passes through a predetermined wiping position in a predetermined movement mode during the wiping operation. In this case, the wiping cycle is typically a cycle in which the wiper 3 reaches the upper reversal position.

The expression "acquisition" may be replaced with another term such as "estimation", "detection", "recognition", "calculation", "generation", "reception", etc., depending on the content, that is, within a technically consistent range.

The constituent elements of the above embodiment are not necessarily essential unless it is specifically stated that the constituent elements are essential in the above embodiment, or unless the constituent elements are obviously essential in principle. In addition, in the case where the number of the constituent elements, the value, the amount, the range, and/or the like is specified, the present disclosure is not necessarily limited to the number of the constituent elements, the value, the amount, and/or the like specified in the embodiment unless the number of the constituent elements, the value, the amount, and/or the like is indicated as essential or is obviously essential in view of the principle. Similarly, in the case where the shape, the direction, the positional relationship, and/or the like of the constituent elements is specified, the present disclosure is not necessarily limited to the shape, the direction, the positional relationship, and/or the like unless the shape, the direction, the positional relationship, and/or the like is/are indicated as essential or is/are obviously essential in principle.

The modified examples are not limited to the above-described examples. A plurality of modified examples may be combined with each other. Furthermore, all or part of the above-described embodiments and all or part of the modified examples may be combined with each other.

For reference to further explain features of the present disclosure, the description is added as follows.

The wiper is basic equipment mounted on a vehicle such as an automobile. The wiper is provided to wipe off raindrops attached to the outer wall surface of the windshield of the vehicle. The drive of the wiper is controlled so that the wiper operates with wiping intervals at a wiping speed according to the amount of rainfall. In recent years, a configuration with a raindrop sensor has become widespread. In such a configuration, the raindrop sensor is provided for detecting raindrops on the inner wall surface of the windshield and the drive of a wiper is controlled by a detection signal of the raindrop sensor. In a vehicle equipped with a raindrop sensor, the raindrop sensor outputs a detection signal corresponding to the amount of rainfall at the location at which the vehicle is present. Therefore, the raindrop sensor can be regarded as an in-vehicle rainfall amount measurement apparatus. That is, by collecting the rainfall amount information from a plurality of vehicles equipped with such raindrop sensors, the collected rainfall amount information can be used as weather information over a wide range.

An apparatus is known as an apparatus for measuring the amount of rainfall using such a raindrop sensor mounted on a vehicle, for example. The apparatus includes a common unit, a rainfall amount measurement unit, and a wiper controller. The common unit functions as a raindrop size detector that detects the sizes of raindrops. The rainfall amount measurement unit is a constituent element for realizing the purpose of measuring the amount of rainfall. The wiper controller is a constituent element for realizing the purpose of driving the wiper. That is, the apparatus has a configuration in which the common unit is provided as a shared configuration, and the constituent elements following the common unit are provided individually to be separated into the rainfall amount measurement unit and the wiper controller.

As described above, the apparatus has a configuration in which (i) a constituent element for realizing the purpose of measuring the rainfall amount and (ii) another constituent element for realizing the purpose of driving the wiper are provided to be separate from each other or in parallel. Therefore, the apparatus has an issue that the apparatus configuration becomes complicated.

Further, the information such as the output of the raindrop sensor used for the wiper control is not the official rainfall amount with general versatility. If non-official rainfall amount measurement values are used, there is a limit to obtaining accurate meteorological information over a wide area by using big data. The "official rainfall amount" is a rainfall amount used in a weather information collection system operated by a government agency or an international organization that handles meteorological services. The official unit of rainfall is, for example, mm/min, mm/h, or the like. Further, the rainfall amount expressed in "mm" and the rainfall amount expressed in "$kg/m^2$" of the international unit system have the same value.

It is thus desired to provide a versatile measurement value of a rainfall amount in a rainfall amount measurement apparatus mounted on a vehicle with a simpler apparatus configuration.

An aspect of the present disclosure described herein is set forth in the following clauses.

According to an aspect of the present disclosure, a rainfall amount measurement apparatus is provided to include an information acquisition unit, a calculation unit, and an output unit. The information acquisition unit is configured to acquire raindrop amount information corresponding to an attachment amount of raindrops attached to an outer wall surface of a windshield of the vehicle in a measurement period based on an output of a detector configured to generate an output corresponding to the attachment amount of raindrops. The raindrop amount information is used to set a wiping interval in a wiper wiping the raindrops attached to the outer wall surface. The calculation unit is configured to calculate a measurement value of a rainfall amount per unit time based on the raindrop amount information acquired by the information acquisition unit. The output unit is configured to output the measurement value calculated by the calculation unit to a communication unit configured to communicate with an outside of the vehicle.

In such a configuration, the detector generates an output corresponding to the amount of the raindrops attached to the outer wall surface of the windshield. The information acquisition unit acquires the raindrop amount information corresponding to the attached amount in the measurement period based on the output of the detector. The raindrop amount information is information used for setting the wiping interval in the wiper that wipes the raindrops attached to the outer wall surface.

The calculation unit calculates the measurement value of the rainfall amount per unit time based on the raindrop amount information acquired by the information acquisition unit. The output unit outputs the measurement value calculated by the calculation unit to the communication unit that communicates with the outside of the vehicle.

With this configuration, the raindrop amount information used for setting the wiping interval of the wiper can be used for calculating the measurement value of the rainfall amount per unit time. Further, the measurement value of the rainfall amount per unit time can be used as official weather information. Therefore, according to such a configuration, it is possible to provide the measurement value of the rainfall amount having versatility with a simpler apparatus configuration.

What is claimed is:

1. A rainfall amount measurement apparatus mounted to a vehicle, comprising:
    a detector configured to generate an output corresponding to the attachment amount of raindrops,
    an information acquisition unit configured to acquire raindrop amount information corresponding to an attachment amount of raindrops attached to an outer wall surface of a windshield of the vehicle in a measurement period based on the output of the detector, the raindrop amount information being used to set a wiping interval in a wiper wiping the raindrops attached to the outer wall surface;
    a calculation unit configured to calculate a measurement value of a rainfall amount per unit time based on the raindrop amount information acquired by the information acquisition unit; and
    an output unit configured to output the measurement value calculated by the calculation unit to a communication unit configured to communicate with an external device disposed outside of the vehicle.

2. The rainfall amount measurement apparatus according to claim 1, further comprising:
    a storage configured to store the raindrop amount information relative to a plurality of the measurement periods,
    wherein:
    the calculation unit includes
        a statistical processing unit configured to apply a statistical process on the raindrop amount information relative to the plurality of measurement periods stored in the storage, and
        a determination unit configured to determine the measurement value based on a result of the statistical process by the statistical processing unit.

3. The rainfall amount measurement apparatus according to claim 2, wherein: the information acquisition unit is configured to acquire the raindrop amount information, which is an integrated value of the output of the detector in the measurement period.

4. The rainfall amount measurement apparatus according to claim 3, wherein:
    a light emitter is provided on a side of an inner wall surface of the windshield opposite to the outer wall surface, to radiate a measurement light towards a detection region on the outer wall surface of the windshield;
    the detector is provided on the side of the inner wall surface to receive a reflection light of the measurement light from the detection region, to generate the output corresponding to an amount of the received reflection light; and
    the raindrop amount information is an integrated value of attachment rate information that is information corresponding to a rate of the raindrops attached to the detection region,
    the rate information being information corresponding to a degree of decrease in the amount of the received reflection light in a plurality of sampling times set in the measurement period, the decrease being caused by the raindrops attached to the detection region.

5. The rainfall amount measurement apparatus according to claim 2, wherein:
    the determination unit is configured to determine the measurement value based on at least one parameter of three parameters of a first parameter being the wiping interval, a second parameter being a vehicle speed, and a third parameter being a form of the output of the detector in the measurement period.

6. The rainfall amount measurement apparatus according to claim 1, wherein:
    the detector, the information acquisition unit, the calculation unit, and the output unit are provided in a raindrop sensor arranged to face the windshield; and
    the raindrop sensor is configured to output the raindrop amount information to a wiper driver configured to control driving of the wiper.

7. A rainfall amount measurement apparatus mounted to a vehicle, comprising:
    a controller circuit electrically connected via a communication link to a detector configured to generate an output corresponding to an attachment amount of raindrops attached to an outer wall surface of a windshield of the vehicle, the controller circuit being configured to
        acquire raindrop amount information corresponding to the attachment amount of raindrops in a measurement period based on the output of the detector, the raindrop amount information being used to set a wiping interval in a wiper wiping the raindrops attached to the outer wall surface,
        calculate a measurement value of a rainfall amount per unit time based on the acquired raindrop amount information, and
        output the calculated measurement value to an external device disposed outside of the vehicle.

8. The rainfall amount measurement apparatus according to claim 7, further comprising:
    a storage configured to store the raindrop amount information relative to a plurality of the measurement periods,
    wherein:
    the controller circuit is further configured to
        apply a statistical process on the raindrop amount information relative to the plurality of measurement periods stored in the storage, and
        determine the measurement value based on a result of the statistical process by the statistical processing unit.

9. The rainfall amount measurement apparatus according to claim 8, wherein: the controller circuit is configured to acquire the raindrop amount information, which is an integrated value of the output of the detector in the measurement period.

10. The rainfall amount measurement apparatus according to claim 9, wherein:
    a light emitter is provided on a side of an inner wall surface of the windshield opposite to the outer wall surface, to radiate a measurement light towards a detection region on the outer wall surface of the windshield;

the detector is provided on the side of the inner wall surface to receive a reflection light of the measurement light from the detection region, to generate the output corresponding to an amount of the received reflection light; and the raindrop amount information is an integrated value of rate information that is information corresponding to a rate of the raindrops attached to the detection region, the rate information being information corresponding to a degree of decrease in the amount of the received reflection light in a plurality of sampling times set in the measurement period, the decrease being caused by the raindrops attached to the detection region.

11. The rainfall amount measurement apparatus according to claim 8, wherein:

the controller circuit is further configured to determine the measurement value based on at least one parameter of three parameters of a first parameter being the wiping interval, a second parameter being a vehicle speed, and a third parameter being a form of the output of the detector in the measurement period.

12. The rainfall amount measurement apparatus according to claim 7, wherein:

the detector and the controller circuit are provided in a raindrop sensor arranged to face the windshield; and the raindrop sensor is configured to output the raindrop amount information to a wiper driver configured to control driving of the wiper.

* * * * *